(12) United States Patent
Martynov et al.

(10) Patent No.: US 7,236,443 B2
(45) Date of Patent: Jun. 26, 2007

(54) OPTICAL SCANNING DEVICE HAVING LESS RESPONSE TO STRAY REFLECTIONS THAT INFORMATION LAYER REFLECTIONS

(75) Inventors: Yourii V Martynov, Eindhoven (NL); Bernardus Hendrikus Wilhelmus Hendriks, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 942 days.

(21) Appl. No.: 10/144,825

(22) Filed: Oct. 25, 2001

(65) Prior Publication Data

US 2003/0058777 A1 Mar. 27, 2003

(30) Foreign Application Priority Data

Oct. 27, 2000 (EP) .................................. 00203751
Jan. 29, 2001 (EP) .................................. 01200310

(51) Int. Cl.
*G11B 7/00* (2006.01)
(52) U.S. Cl. ............................. 369/112.01; 369/112.23; 369/120
(58) Field of Classification Search .................. 369/94, 369/100, 112.01, 112.23, 112.24, 112.25, 369/112.26, 116, 120, 121, 126
See application file for complete search history.

(56) References Cited

U.S. PATENT DOCUMENTS 6,208,610 B1 *  3/2001  Kawakami et al. .... 369/112.01
6,496,450 B2 * 12/2002  Watanabe ................ 369/13.38

FOREIGN PATENT DOCUMENTS

| DE | 19910109 A | 9/1999 |
| EP | 0867873 A2 | 9/1998 |
| EP | 0977192 A1 | 2/2000 |
| EP | 0987699 A1 | 3/2000 |
| JP | 09161311 | 6/1997 |

* cited by examiner

*Primary Examiner*—Paul W. Huber

(57) ABSTRACT

An optical scanning device incorporating a compound objective lens 10 and a radiaion detector 31 is described for reading an optical record carrier 1 in which the optical record carrier 1 is provided with a transparent layer 2. The thickness of the transparent layer 2 and the effective radius of the detector 31 are adapted such that the signal-to-noise ratio of the device is significantly improved and/or local heating of an air gap below an air slider is reduced. The optical record carrier is provided with a lubricant to facilitate the use of a slider optical head 40.

21 Claims, 4 Drawing Sheets

OPTICAL SCANNING DEVICE HAVING LESS RESPONSE TO STRAY REFLECTIONS THAT INFORMATION LAYER REFLECTIONS

This invention relates to an optical scanning device for scanning an optical record carrier, such as an optical disk, including at least one information layer. The device includes a radiation source for generating a radiation beam, a compound objective lens system located in an optical path between the radiation source and the record carrier for converging the radiation beam to a spot on an information layer and a slider having an optically transparent part for transmitting radiation from the radiation source. The invention also relates to an optical record carrier for use in such an optical scanning device.

There is a need for the production of optical scanning devices capable of reading high capacity record carriers. For example, high capacity optical disks have been devised that have multiple information layers in a single disk. Furthermore, it is also possible to increase the amount of data stored on such a disk by decreasing the size of the data markings on the disk. In order to read such data accurately, optical scanning devices using a relatively short wavelength and a high numerical aperture (NA) objective lens system with at least say NA>1 are desirable.

In one solution to achieve NA>1, the compound lens system includes a multi-lens objective, where one of the lens elements is a second, substantially plano-convex, lens placed on a slider which allows the lens to fly at a height within a wavelength $\lambda$ of the surface of the disk, to provide an evanescent coupling between the second lens and the disk for the radiation, a so-called near-field arrangement. The lens typically flies at a height of $\frac{1}{5}\lambda$ (generally less than 0.1 µm). Such a lens is referred to herein as a solid immersion lens (SIL). The multi-lens objective will include a further lens element, such as a single lens well corrected for aberrations. See, for example EP-A-0,867,873 and JP-A-09161311.

In the case of EP-A-0,867,873 a record carrier uses a transparent layer having a thickness between 3 and 177 µm to cover the information layer, where the thickness is selected to aid the increase in storage capacity of the optical disk. No evanescent coupling is used to couple radiation into the record carrier; i.e. the record carrier is used in a far-field arrangement.

In the above disclosed systems, the radiation is focussed on the information layer of the optical disk and the reflected radiation is transmitted back through the compound objective lens system towards a suitable detection system where the optical signal is converted into electrical signals representative of the data stored in the information layer on the optical disk. A problem with this system is that stray light at the detector reduces the signal to noise ratio.

A further problem in a magneto-optic system relates to the positioning of the magnetic coil in relation to the information layer of the disk. Namely, the coil must be placed sufficiently close to the information layer to allow sufficient magnetic modulation at the information layer during recording and to allow a desired data scanning rate. This problem occurs in a so-called far-field arrangement, where there is no evanescent coupling between the lower surface of the objective lens system and the top surface of the disk.

In EP-A-0,878,793 a magneto-optic system is described in which a magnetic coil is placed on the same side of the disk as the objective lens system, and the information layer on the disk is placed behind a protective transparent layer of between 0 and 100 µm thickness. The distance between the magnetic coil and the optical disk is preferably set at at least 20 µm.

According to an aspect of the invention there is provided An optical scanning device adapted to be used for scanning an optical record carrier when located in a scanning position in the device, the optical record carrier including an information layer for storing data and a transparent layer through which radiation passes to reach the information layer, the device including a radiation source for generating a radiation beam, an objective lens system located in the path of the radiation beam from the radiation source to the scanning position of the optical record carrier to provide for an evanescent coupling of the radiation beam with the optical record carrier, and a radiation detector for detecting radiation reflected by the optical record carrier, wherein the detector is configured, in combination with a thickness of the transparent layer, such that a significant proportion of stray reflected light, during scanning, falls outside an effective part of the detector, whilst substantially all radiation reflected by the information layer falls inside the effective part of said detector.

In prior art systems a portion of the radiation transmitted from the radiation source towards the optical disk is reflected from the air gap back into the optical path without having reached the information layer of the optical disk. As the air gap is small, the radiation reflected from the air gap will follow substantially the same path as the radiation reflected from the information layer of the optical disk and as such, will be transmitted back through the compound objective lens system and fall onto the detection system. This will adversely affect the signal-to-noise ratio (SNR) of the optical scanning system, and will lead to poor reproduction of the information stored on the disk.

The present invention is capable of providing a significant improvement in the SNR during the scanning of an optical record carrier using the device, by preventing stray radiation reflected from the gap impinging on the effective part of the detector. Whilst the term "significant proportion" is intended to include arrangements providing a relatively small amount of reduction in the stray radiation (say 10% or more), larger reductions, above 50% are preferred. Indeed, it is possible to reduce the amount of stray radiation by over 90%, as will be described in further detail below. At the same time, it is possible to ensure that "substantially all" the wanted radiation does follow a path such that it impinges on the effective part of the detector. Whilst some loss of the wanted radiation is unavoidable in the optical system due to e.g. absorption, reflection and limitation in detector efficiency, this loss is mostly not due to the locational relationship of the path of the wanted radiation with the detector, which may remain optimized in embodiments of the invention.

This invention is applicable in the case of both near-field and far-field arrangements. However, the invention is particularly applicable in the case of near-field arrangements. In this case any reduction in the efficiency of the near-field coupling, due for example to flying height variations, can cause total internal reflection at the interface, whereby significant amounts of stray light can be generated.

In prior art systems coherent cross-talk between the signal layer and the radiation reflected from the air gap can cause significant deterioration in the signal-to-noise ratio and servo signals. The present invention is also capable of reducing such coherent cross-talk, in both the near-field and the far-field case. To have low coherent cross-talk from the air gap it is preferable to have the transparent layer thickness above the value:

$$d = \frac{20 \cdot \lambda \cdot n_{cov}}{(NA)^2}$$

where λ is the radiation wavelength, $n_{cov}$ is the refractive index of the transparent layer, also called cover layer, and NA is the numerical aperture of the system at the disk.

According to a further aspect of the invention there is provided an optical scanning device adapted to be used for scanning an optical record carrier when located in a scanning position in the device, the optical record carrier including an information layer for storing data and a transparent layer having a thickness of between 2 and 50 µm through which radiation passes to reach the information layer, the device including a radiation source for generating a radiation beam, an objective lens system located in the optical path between the radiation source and the scanning position of the optical record carrier, a slider for flying at a height of less than 20 µm above the optical record carrier and having a transparent portion for transmitting said radiation beam, and a radiation detector for detecting radiation reflected by the optical record carrier.

An advantage of a transparent layer of between 2 and 50 µm thickness is that it can be used to reduce the heating effect of the laser beam at the entrance face of the record carrier, i.e. the surface through which the radiation enters the record carrier. The heating at the entrance face may cause unwanted flying height instabilities of the slider, and if a surface lubricant is used on the record carrier, unwanted localised heating of the lubricant. The reduction of the heating is particularly important during writing data on the record carrier, when the power in the radiation beam is relatively high. The transparent layer places the entrance face at least one focal depth ($\lambda/NA^2$) away from the focus of the laser beam, such that the laser beam is not so close to its smallest possible diameter as it passes through the surface of the record carrier, thereby reducing the intensity of its heating effect at the entrance face.

Thus a slider, flying at a height of up to 10–20 µm above the record carrier surface, may also be used in far-field arrangements, in particular in magneto-optic systems. This is also a narrow gap, allowing a magnetic coil to be held sufficiently close to the disk surface to achieve high data scanning rates, but less narrow than that required for an evanescent coupling.

According to a yet further aspect of the present invention, there is provided an optical record carrier for use with an optical scanning device according to the invention, the optical record carrier being adapted for use with radiation of a predetermined wavelength and an objective lens system of a predetermined numerical aperture, wherein the optical record carrier includes an information layer for storing data and a transparent layer through which radiation passes to reach the information layer, the outer surface of the transparent layer having a lubricant coating for improving the scanning characteristics when scanned with a slider, in which the thickness of the transparent layer is at least $$d = \frac{5 \cdot \lambda \cdot n_{cov}}{NA_{NF}},$$

where d is the thickness of the transparent layer, λ is the radiation wavelength, $n_{cov}$ is the refractive index of the transparent layer, $NA_{NF}$ is the numerical aperture of the objective lens system.

Further features and advantages of the invention will become apparent from the following description of preferred embodiments of the invention, given by way of example only, with reference to the accompanying diagrams in which.

Figure 1:
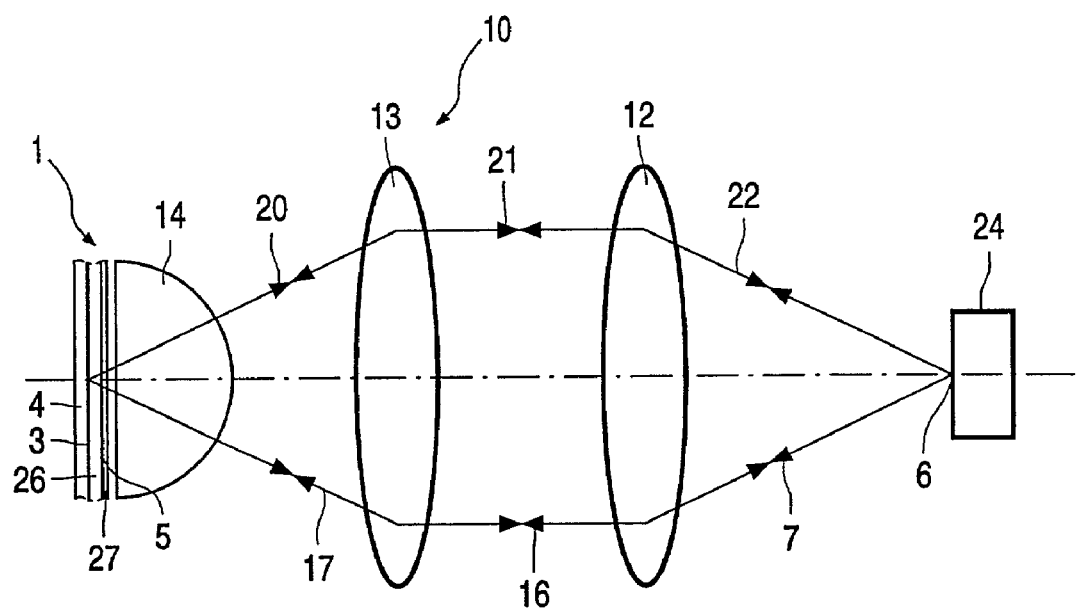
FIG. 1 is a schematic illustration of a general layout of an optical scanning device used in accordance with embodiments of the invention.

FIG. 1 shows a cross-section of an embodiment of an optical record carrier 1 in the form of a disk according to the invention, which includes an outer transparent layer 26 covering at least one information layer 3. In the case of a multilayer optical disk, two or more information layers are arranged behind the transparent layer 26, at different depths within the disk. The side of the information layer 3, or in the case of a multilayer disk the side of the layer furthest away from the transparent layer 26, facing away from the transparent layer is protected from environmental influences by a protection layer 4. The side of the transparent layer facing the device is the disk entrance face 5.

Information may be stored in the information layer 3 or layers of the optical disk 1 in the form of optically detectable marks arranged in substantially parallel, concentric or spiral tracks, not shown in FIG. 1. The marks may be in any optically readable form, for example in the form of pits or areas with a reflection coefficient different from their surroundings, or magneto-optical form.

The optical scanning device includes a radiation source 6, for example a semiconductor laser, emitting a diverging radiation beam 7. The optical path includes a collimator lens 12 and a compound objective lens system 10 that includes a back lens element 13 and a front lens element 14. The front lens element 14 is a plano-convex SIL. Each of the collimator lens 12 and the back lens element 13 are shown in FIG. 1 as convex lenses, however, other lens types such as plano-convex, convex-concave or concave-convex lenses may also be used. Particular reference is made to the arrangement shown in FIG. 2, to be described below.

The collimator lens 12 transforms the diverging radiation beam 7 to a generally collimated beam 16. By collimated, a beam substantially parallel to the optical axis of the system is meant. The position of the collimator 12 is, in this embodiment, fixed but the collimator can also be axially movable by means of a focus servo operation to maintain focusing of the beam spot on the desired information layer position.

The second lens element transforms the beam 16 to a convergent beam 17 between the back lens element 13 and the front lens element 14. The back lens element 13 is, in this embodiment, axially movable by means of a focus servo operation to maintain focusing of the beam spot on the desired information layer position but can also be fixed with respect to the front lens 14. The effect of the front lens element 14, being an SIL, is to increase the numerical aperture of the system further, without introducing spherical aberration, or reducing unwanted spherical aberrations, as the beam enters the entrance face 5 of the disk, thereby increasing the convergence of the beam inside the transparent layer 2 compared to the effect achieved without a SIL present. The beam is therefore focussed by the compound objective lens 10 to a point on the information layer 3 within the optical disk 1.

The reflected beam is transformed by the compound objective lens 10 in correspondingly opposite stages, from a greatly divergent beam 20 between the front lens element 14 and the back lens element 13, to a collimated beam 21 between the back lens element 13 and the collimator lens 12, to a convergent reflected beam 22 incident on a detector system 24.

The detector system 24 captures the radiation and converts it into electrical signals. One of these signals is an information signal, the value of which represents the data read from the information layer 3 of the optical disk 1.

The objective lens is held close to the entrance face of the upper disk, within 1 wavelength of the radiation, generally within 1 μm by means of an air-bearing slider (not shown) of suitable dimensions. In order to improve the tribology of the interface, a lubricant 27 is coated on the transparent layer 26. The entrance face of the disk is now formed by the surface of the lubricant coating facing the front lens element 14. The lubricant may be formed from a polyfluoropolyether, such as those known as Fomblin™ and Zdol™. The lubricant forms a uniform layer of thickness typically less than 1 nm, formed by dip-coating the disk in a solution of the lubricant. The top surface of the transparent layer may be treated with a hard coating of diamond-like carbon before the application of the lubricant, to improve the application of the lubricant.

Figure 2:
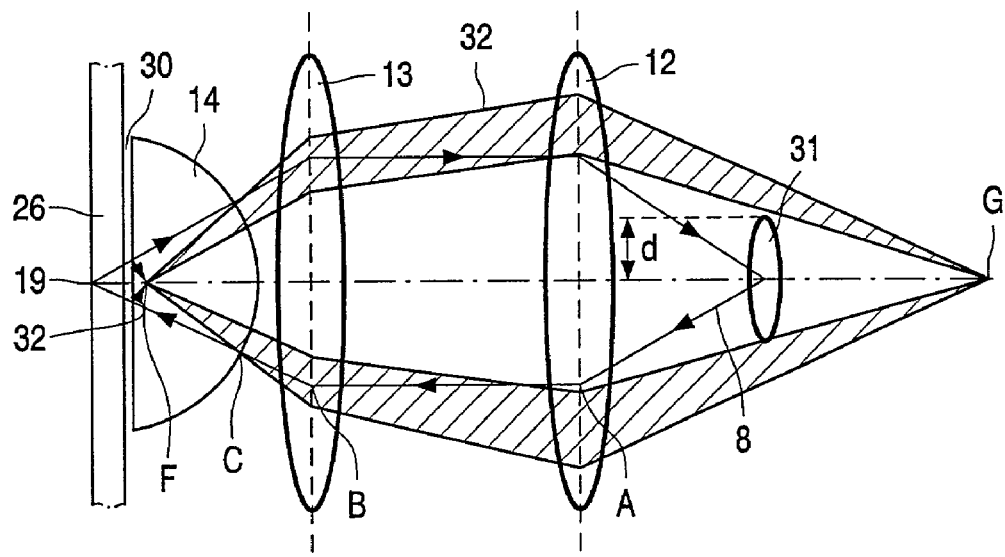
FIG. 2 is a cross sectional view of a compound objective lens system including a detector and transparent layer used in accordance with the invention.

FIG. 2 shows an optical scanning device including a two-lens objective lens system 10 as described above. The collimator lens element 12 is a convex lens; the back lens element 13 is a convex lens; and the front lens element 14 is a spherical plano-convex SIL. The positions of the SIL 14 and the lubricant-coated transparent layer 26 together define an air gap 30.

An exemplary outer ray 8 of the radiation beam 7 in FIG. 2 enters the objective lens system 10 and is incident on the collimator lens element 12 and is refracted towards the optical axis at the point A. The ray is then incident on the first lens element 13 and is further refracted towards the optical axis at point B by the first lens element. The ray exits the second lens element and is incident on the entrance surface of the SIL 14 at point C. In this embodiment the ray is not refracted to a substantial extent at the entrance of the SIL 14, the air gap 30 or the transparent layer 26. It should be added that an alternative configuration of SIL providing additional focusing, as is known in the art, is also applicable within the framework of the current invention. The radiation entering the objective lens system is focussed by the lenses 12, 13, 14 to a point 19 on the, or an, information layer 3 of the optical disk 1. The ray is then reflected by the optical disk 1.

The lenses 12, 13, 14 transform the reflected ray, in correspondingly opposite stages towards a detector, the effective part 31 of which is shown in perspective, where the radiation is captured and converted into electrical signals corresponding to the data on the information layer of the optical disk 1.

When the radiation beam passes through the SIL 14, as described previously, a portion of the incident radiation will be reflected by the air gap 30 back into the optical path and hence to the effective part 31 of the detector. However, by selecting an appropriate thickness of transparent layer 2 and a size of the detector 31, it is possible to attain de-focus of the rays reflected by the air gap 30, with respect to the rays reflected by the information layer 3 of the optical disk 1, such that at least a significant proportion, preferably substantially all of the rays reflected by the air gap are not incident on the detector 31.

The reflection of rays of the radiation beam 7 in the SIL at the interface with the air gap 30 increases with increasing NA. Rays having NA>1 are reflected at the interface by total internal reflection. The part of the radiation beam reflected by the interface, called beam part 32, is shown in FIG. 2 by a hatched area. The beam part 32 is converges to a focus point F within the SIL 14, then de-focussed by the SIL 14 and the second lens element 13, and subsequently brought to focus by the first lens element 12 at a point G behind the detector 31. In the plane of the detector, beam part 32 does not impinge on the effective part 31 having a radius rd of the detector (although it may impinge on part of the detector, such as a non-radiation-sensitive part where it does not contribute to the electrical detector signals). In this way, the detector 31 detects only the rays of the radiation beam reflected by the information layer 3 and not the rays reflected by the air gap 30. This improves the signal-to-noise ratio of the detector signals.

This result may be achieved by appropriately arranging the effective detector radius $r_d$ and the thickness of the transparent layer 26. Namely, the thickness of the transparent layer 26 should be selected to fall within a certain range and the detector size should be limited. The values of these parameters can be expressed for every optical recording system in a form dependent on the exact choice of system parameters, like NA and λ.

The minimum thickness of the transparent layer 26 and the radius of the detector 31 can be estimated as follows on the basis of ray trace calculations.

Consider the rays in FIG. 2. Let the system have a total numerical aperture equal to $NA_{NF}>1$. The reflected rays are focused on a detector in a diffraction-limited image since such configuration ensures the best selectivity between the rays reflected from the information carrier and from the air gap. To avoid signal deterioration, the detector size should be substantially larger than the spot size on the detector 31. If the lens focusing the rays on the detector has a numerical aperture of $NA_{det}$, the preferred detector radius $r_d$ can be estimated as:

$$r_d \sim 10 \frac{\lambda}{NA_{det}} \tag{A}$$

Those rays focused on the disc whose angles of incidence θ on the air gap are within a ring defined by $1<(n \sin\theta)<NA_{NF}$ will be reflected from the air gap with higher reflection coefficients and are relatively more harmful from the point of view of signal-to-noise ratio deterioration. 'n' is the refractive index of the material in which the angle θ is determined. In order that the rays of the beam part 32 just miss the detector, these rays should converge at a point G lying a distance $\Delta l$ behind the detector surface, where:

$$\Delta l = \frac{r_d}{NA_{det}} NA_{NF} \quad (B)$$

Substituting from (A):

$$\Delta l = \frac{10 \cdot \lambda \cdot NA_{NF}}{(NA_{det})^2} \quad (C)$$

If the transparent layer 26 is assumed to have a refractive index $n_{cov}$ generally not equal to the refractive index of the SIL 14, $n_{SIL}$, a virtual source reflected from the air gap 30 will be displaced with respect to the spot on the information layer 3 by a value of:

$$\Delta z = 2d \frac{n_{SIL}}{n_{cov}}$$

where d is the thickness of the transparent layer 26.

The presence of the SIL will cause the spot to be displaced at the detector side by:

$$\Delta l = \Delta z \cdot n_{SIL} \frac{(NA_{NF}/n_{SIL})^2}{(NA_{det})^2} = \Delta z \frac{(NA_{NF})^2}{n_{SIL}(NA_{det})^2} = \frac{2d(NA_{NF})^2}{n_{cov}(NA_{det})^2}$$

If this value of $\Delta l$ is substituted into Equation (C), a value for the minimum thickness of the transparent layer 26 is obtained:

$$\frac{2d(NA_{NF})^2}{n_{cov}(NA_{det})^2} = \frac{10 \cdot \lambda \cdot NA_{NF}}{(NA_{det})^2}$$

$$d = \frac{5 \cdot \lambda \cdot n_{cov}}{NA_{NF}}$$

The value of de-focus on the detector, $A_{20}$ (in terms of Zernike coefficients) is given by:

$$A_{20} = \frac{\Delta l (NA_{det})^2}{4}$$

so substituting for $\Delta l$ given in equation (B) above:

$$A_{20} = \frac{r_d NA_{NF}}{NA_{det}} \frac{(NA_{det})^2}{4}$$

$$A_{20} = \frac{NA_{det} \cdot r_d \cdot NA_{NF}}{4}$$

and substituting for $r_d$ given in equation (A) above:

$$A_{20} \sim 2.5 \cdot \lambda \cdot NA_{NF}$$

For example, for $NA_{NF}=1.4$ $$A_{20} \sim 3.52\lambda$$

Figure 3A:
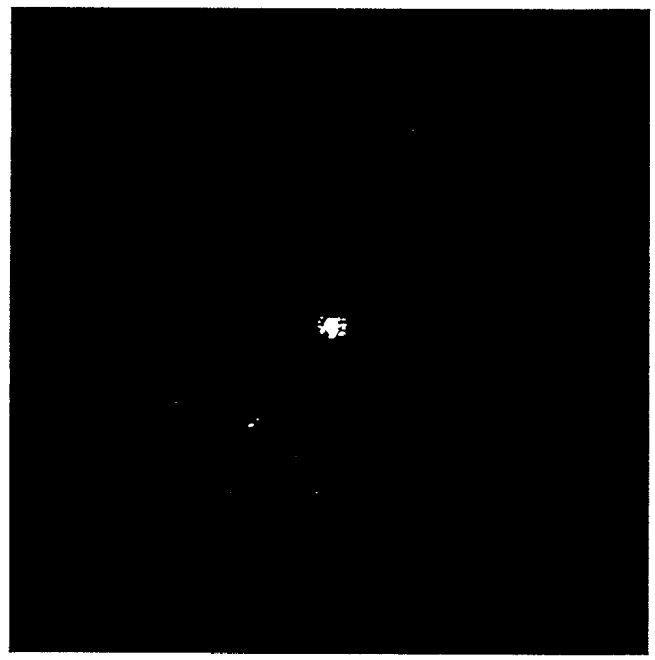
FIG. 3a shows the radiation reflected towards the detection system generated by reflection of radiation from the information layer of an optical disk using the objective lens system of FIG. 2.
Figure 3B:
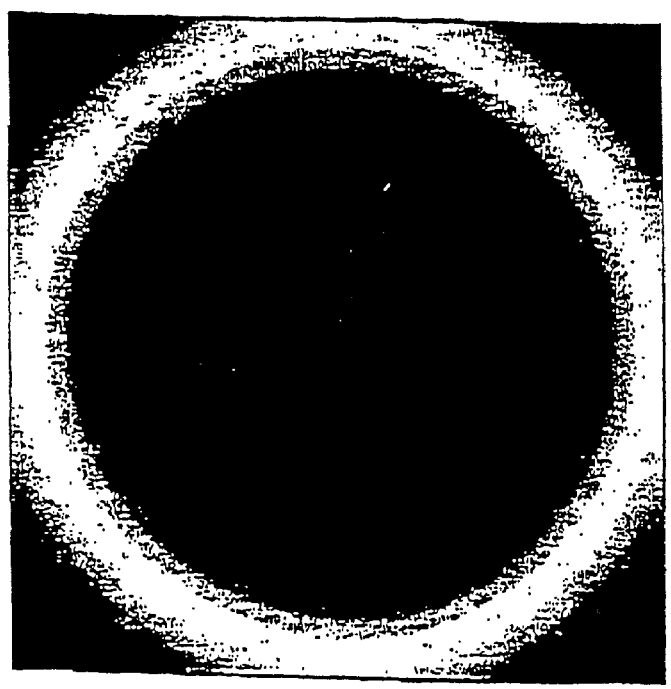
FIG. 3b is a simulation of the radiation reflected towards the detection system generated by reflection of radiation from the air gap between the SIL and the optical disk using the objective lens system of FIG. 2.

The findings of this paraxial analysis are further confirmed by numerical modelling of diffraction. FIG. 3a shows the light intensity of a beam reflected from the information layer 3 of an optical disk 1 and focused on the detector. FIG. 3b shows the light intensity corresponding to a ring $1 < (n \sin\theta) < NA_{NF}$ with a value of $3\lambda$ de-focus ($A_{20}$) focused on the same detector. In this way, with a de-focus of $3\lambda$, a detector can have a size larger than the spot shown in FIG. 3a, but smaller than the ring of light reflected by the air gap 30 and shown as a ring in FIG. 3b, so as to collect only rays that have been reflected by the information layer 3 of the optical disk 1. In this way the stray beams reflected by the air gap 30 miss the detector 31.

Figure 4:
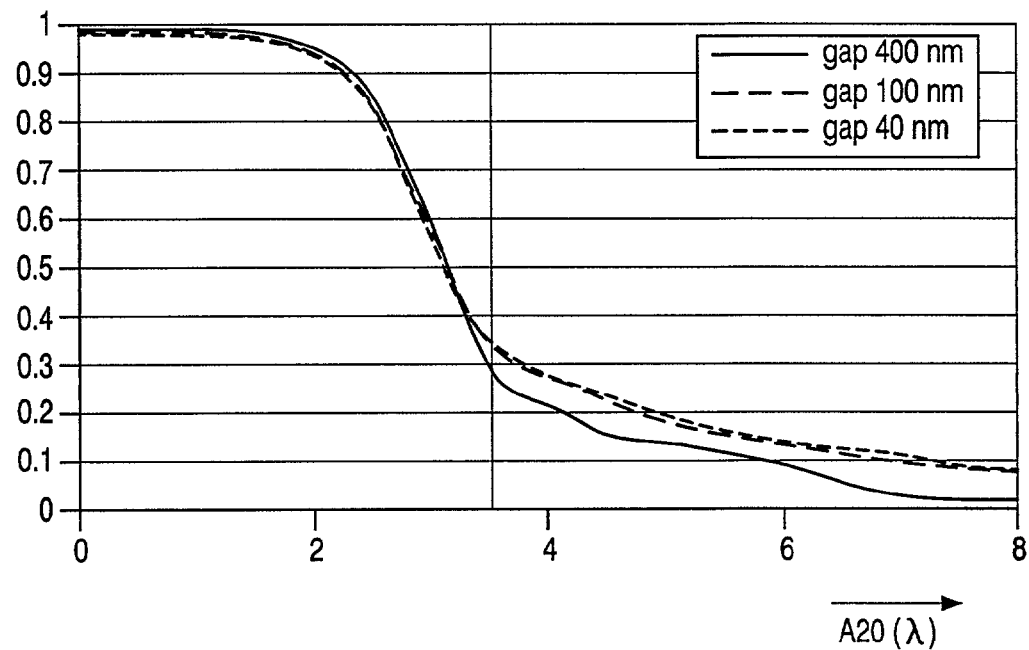
FIG. 4 shows the dependency of detector signals as a function of defocus ($A_{20}$) for a detector and for a number of different thickness air gaps.

A more detailed analysis using an actual distribution of intensity of the rays reflected from a sub-wavelength air gap rather than the ring intensity distribution described above has been carried out. Using the radiation intensity distribution reflected from air gap 30 the total intensity of radiation collected by the detector has been calculated for three different thicknesses of the air gap. The dependency of the signals detected by the detector on the defocus, $A_{20}$, is shown by the graph in FIG. 4 for air gaps of 40, 100 and 400 nm. The size of the detector is given by the above equation (A), where the value of $NA_{det}$ was chosen as 0.1 in the calculation. It can be seen that if the value of $A_{20}$ is 0, between 90 and 95% of the stray light reflected by the respective air gaps will fall on the detector and reduce the signal-to-noise ratio. In order to ensure that only approximately 10% of the light reflected by these air gaps, of between 40 and 400 nm, falls on the detectors, a defocus value ($A_{20}$) of $7.5\lambda$ is required. On basis of this more detailed analysis the criterion for the transparent layer thickness d is:

$$d \geq \frac{11 \cdot \lambda \cdot n_{cov}}{NA_{NF}}$$

The maximum thickness of the transparent layer is limited by the respective geometry of the SIL 14 and the optical disk 1 in the optical scanning device. This maximum value can be estimated as follows.

Figure 6:
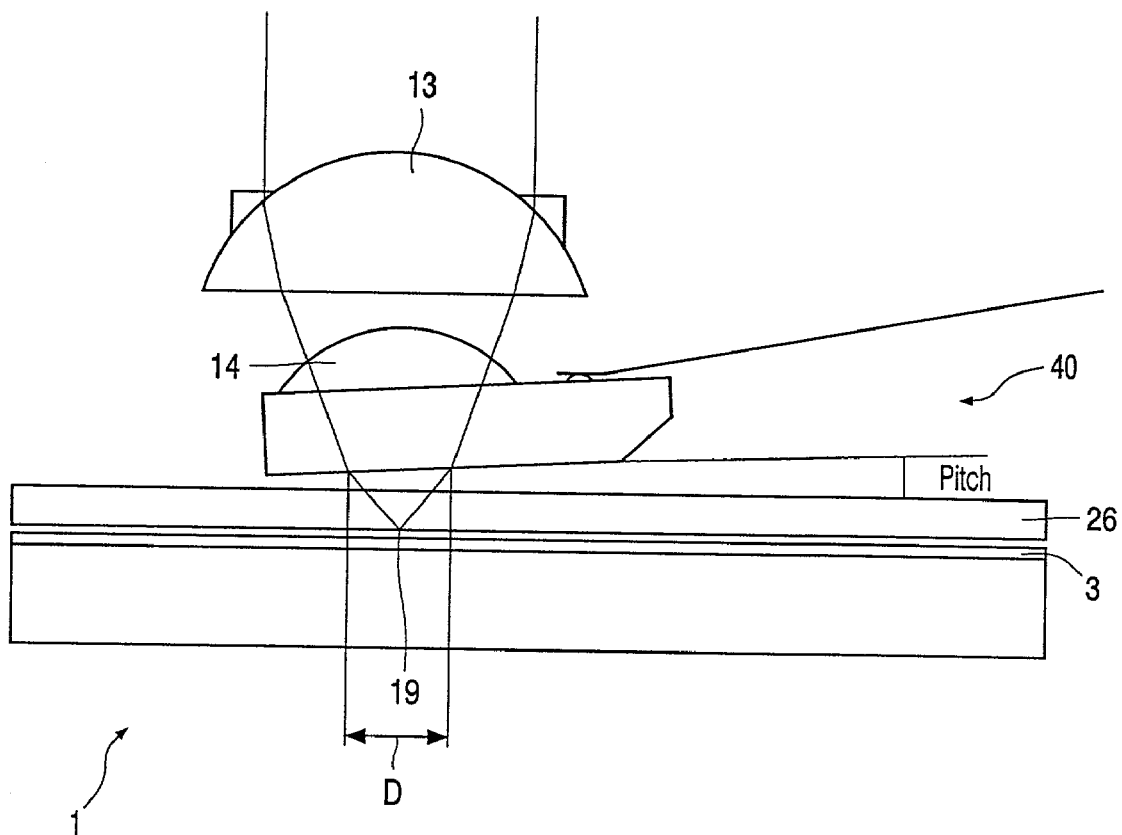
FIG. 6 shows a schematic side view of a compound objective lens system mounted in an optical scanning device in accordance with an embodiment of the invention.

In use, the SIL 14 is placed on an air-bearing slider schematically shown at 40 in FIG. 6. The slider, in one embodiment in which the optical scanning device is a magneto-optic scanning device, also includes a magnetic coil (not shown). Because of the presence of a transparent layer 26 on the disk, the spot diameter at the exit surface of the slider is D. During operation of the scanning optical device, the slider 40 commonly has a 'pitch'—an inclination with respect to the optical disk surface. A typical value of pitch is 0.15 to 0.2 mrad. As a consequence, the air gap thickness for marginal beams at the front and at the rear of the spot is different, causing a difference in near-field coupling efficiency.

Assuming an acceptable air gap thickness difference of 15 nm, D must be less that 100 μm. If the system is to be used for Magneto Optic (MO) readout and carries a thin film coil (not shown) at the bottom of the slider 40, the beam diameter at this surface is limited by the coil's bore diameter and should be less than 50 μm. This limits the thickness of the transparent layer 26 (depending on its refractive index) to 15–20 μm.

It will be appreciated that a judicious choice of the transparent layer thickness and detector size can cause a significant proportion of radiation reflected by the air gap to fall outside the effective part of the detector 31. A significant proportion is considered to be an amount such as to improve the performance of data collection of the scanning optical device. For example, if at least 50% of the radiation reflected by the air gap falls outside the effective part of the detector, this would improve the data detection ability of the scanning device and hence improve the signal to noise ratio. Preferably, the value of the transparent layer thickness and the detector size are selected such that 90% of the radiation reflected by the air gap falls outside the effective area of the detector 31.

As described previously, a further problem of such optical scanning devices is coherent cross talk between the signal layer and the light reflected by the air gap. It has been found that this cross talk is substantially independent of detector size. The values of coherent cross-talk from a transparent layer as a function of defocus of light ($A_{20}$) reflected from three air gaps, again of 40, 100 and 400 nm, on a detector having a radius as defined above have been calculated and the results are shown in FIG. 5.

Figure 5:
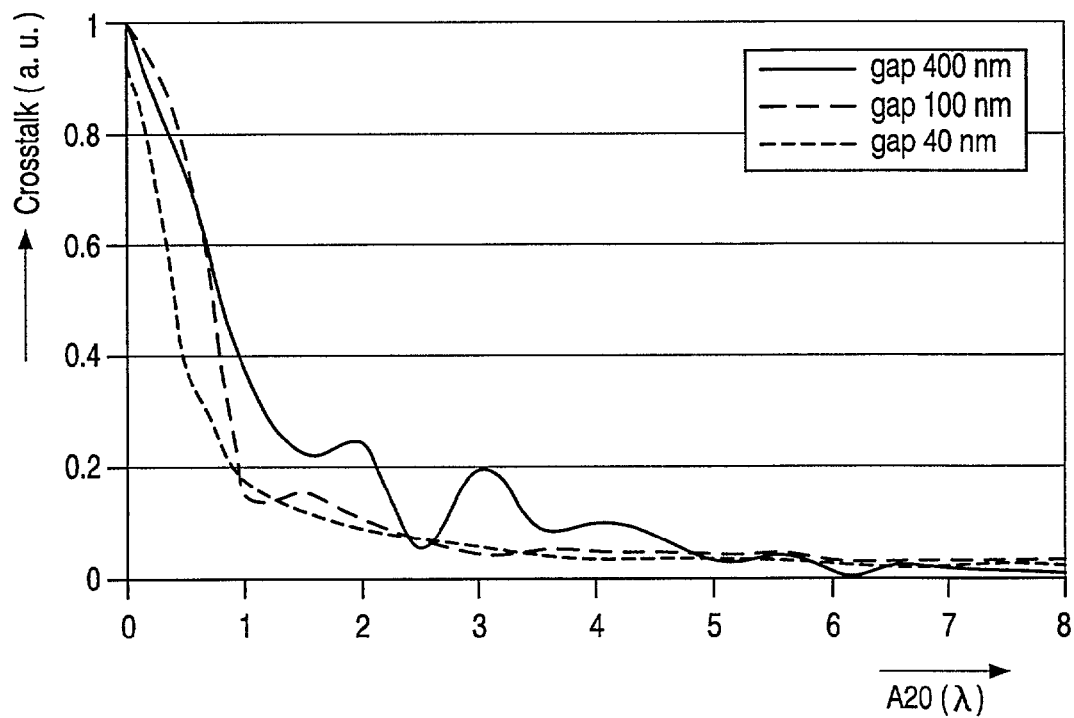
FIG. 5 shows the value of cross talk for three different thickness air gaps as a function of defocus ($A_{20}$) of stray radiation on a relatively large detector.

FIG. 5 shows that for defocus values ($A_{20}$) of 2.5λ, 3.5λ and 7.5λ (taken from FIG. 4 in a manner described above) and hence transparent layer 26 thicknesses of 1.6 µm, 2.3 µm and 4.6 µm respectively (calculated above) the coherent cross talk is significantly reduced.

To have low coherent cross-talk from the air gap it is preferable to have the transparent layer thickness above the value:

$$d = \frac{20 \cdot \lambda \cdot n_{cov}}{(NA)^2}$$

To reduce the coherent cross-talk even further an anti-reflection coating can be applied on top of the transparent layer.

So far only diffraction-limited imaging of the spot on the detector has been considered since it allows use of the smallest detector and thus to achieve the best improvement in signal to noise ratio. However, the current invention is not limited to this case. Typically in optical systems the spot on the detector is not diffraction limited and has a larger size. The system may have a quadrant detector in combination with an astigmatic servo lens, Focault or spot-size focal error detection schemes. The size of the spot and thus the detector size is then determined by choices made for a particular system, for example by the size of the circle of least confusion in case of astigmatic focus error detection or by the size of a defocused spot in case of the spot size detection scheme. According to the present invention the spot due to the reflection from the air gap must be sufficiently larger than the detector size. In particular, in order for 90% of this light to miss the detector its typical dimension Dd must comply with the following relation:

$$D_d \leq \frac{2\Delta l \cdot NA_{det}}{\sqrt{10}} = \frac{4d(NA_{NF})^2}{\sqrt{10} \cdot n_{cov} NA_{det}} \text{ or } d \geq \frac{\sqrt{10} \cdot n_{cov} NA_{det} D_d}{4(NA_{NF})^2}$$

For example, for a typical detector size $D_d$=120 µm used in current optical heads and $NA_{det}$=0.1, $NA_{NF}$=1.4, $n_{cov}$=1.8 the thickness of the transparent layer should be d≧8.7 µm.

Besides the deterioration of the signal to noise ratio the reflection from the air gap in such a system may cause an apparent shift of the s-curve of the focal error signal. In order to prevent that in another aspect of the present invention it is proposed to use an additional set of segments on the detector. Several embodiments of such detectors intended to work with multilayer optical discs are described in EP 0 777 217 A2.

In the above embodiment, the slider is used for providing an air gap sufficiently small to allow evanescent coupling. In another embodiment, a slider is used to provide a low flying height for a magnetic coil in a magnetic field modulation system for a magneto-optical recordable disk. In that case the slider flies at a height of less than 20 µm, preferably less than 10 µm. More preferably, the air gap is in the region of 1–2 µm. In the absence of a transparent layer, the top surface of the disk and the air film in the air gap will be heated locally, possibly leading to flying instability of the slider. If a lubricant is applied on the disc surface, it too will be heated, which can lead to its degradation. However, by providing, according to the invention, a transparent layer on the disk of a suitable thickness the localised heating effect can be reduced. The transparent layer should then be greater in thickness than the focal depth of the beam, such that the beam where it passes through the top surface of the disk is not at its minimum diameter. A lubricant coating, as described above, may also be added in order to improve the tribology of the interface with the air-bearing slider.

In the slider embodiment the thickness of the transparent layer can be chosen in a wide range from about 2 µm up to 50 µm. It is further advantageous to have it thick enough to avoid coherent optical cross-talk from the reflection on the top of this layer during read out. In the far-field case if is preferable to select the thickness at between 7 and 50 µm. As specific examples, for λ=405 nm and NA=0.85 (at the optical disk surface) it is about 20–30 µm; for λ=405 nm and NA=1.4 (at the optical disk surface) it is about 7–15 µm.

The reduction in localized heating by use of a transparent layer on the disk is also useful in the near-field case described above; in this case the thickness of the transparent layer is preferably between 2 and 15 µm.

The air-bearing slider used in the above-described embodiments is at least partly transparent and the characteristics of the radiation beam are altered as the beam passes through it; the slider may carry a plano-convex lens as described above. Alternatively, the slider may carry two or more lenses of a multi-lens objective, which may be used in order to achieve higher numerical apertures.

A transparent layer 26, as described above, can be fabricated, for example, using spin coating of UV curable resin or by sputtering of some highly refractive material, for example $SiO_2/Si_3N_4$.

Spin coating produces a smooth layer having a low refractive index, of the order of 1.52. This limits the numerical aperture NA to a maximum of 1.35 to 1.4, whereas 1.6 or greater is preferable for near field applications. Furthermore, if spin coating is used, an additional hard coating is preferred.

Sputter coating can produce a transparent layer with a higher refractive index, which is sufficiently hard.

It will be appreciated that other suitable materials or processes may be used to fabricate a suitable transparent layer. It is envisaged that various modifications and variations may be employed in relation to the above-described embodiments, without departing from the scope of the invention, which is defined in the accompanying claims.

The invention claimed is:

1. An optical scanning device adapted to be used for scanning an optical record carrier when located in a scanning position in the device, the optical record carrier including an information layer for storing data and a transparent layer through which radiation passes to reach the information layer, the device including a radiation source for generating a radiation beam, an objective lens system located in the path of the radiation beam from the radiation source to the scanning position of the optical record carrier to provide for an evanescent coupling of the radiation beam with the optical record carrier, and a radiation detector for detecting radiation reflected by the optical record carrier, wherein the detector is configured, in combination with a thickness of the transparent layer, such that a significant proportion of stray reflected light, during scanning, falls outside an effective part of the detector, whilst substantially all radiation reflected by the information layer falls inside the effective part of said detector.

2. An optical scanning device according to claim 1, in which there is a small air gap between the scanning device and the record carrier and at least 50% of the radiation reflected by the gap falls outside the effective part of the detector.

3. An optical scanning device according to claim 2, in which at least 90% of the radiation reflected by the gap follows a path falling outside the effective part of the detector.

4. A optical scanning device according to claim 1, wherein the position and dimensions of the detector are configured to provide the said configuration.

5. An optical scanning device according to claim 1, wherein said stray light is reflected by an interface between the objective lens system and an air gap, where NA>1, where NA is a numerical aperture.

6. An optical scanning device according to claim 1, wherein said optical record carrier is a recordable optical record carrier.

7. An optical scanning device according to claim 1, in which the thickness of the transparent layer is at least $$d = \frac{5 \cdot \lambda \cdot n_{cov}}{NA_{NF}},$$

where d is the thickness of the transparent layer, $\lambda$ is the radiation wavelength, $n_{cov}$ is the refractive index of the transparent layer, $NA_{NF}$ is the numerical aperture of the objective.

8. An optical scanning device according to claim 1, in which the thickness of the transparent layer is at least $$d = \frac{11 \cdot \lambda \cdot n_{cov}}{NA_{NF}}.$$

where d is the thickness of the transparent layer, $\lambda$ is the radiation wavelength, $n_{cov}$ is the refractive index of the transparent layer, $NA_{NF}$ is the numerical aperture of the objective.

9. An optical scanning device according to claim 1 in which the thickness of the transparent layer is at least 1.6 µm.

10. An optical scanning device according to claim 9, in which the thickness of the transparent layer is at least 2.3 µm.

11. An optical scanning device according to claim 9, in which the thickness of the transparent layer is at least 4.6 µm.

12. An optical scanning device according to claim 1, in which the corresponding detector size is less than $$r_d \sim 10 \frac{\lambda}{NA_{det}}.$$

where $r_d$ is the detector radius, $\lambda$ is the radiation wavelength, $NA_{det}$ is the numerical aperture of the detector.

13. An optical scanning device according to claim 1, in which the thickness of the transparent layer is less than 20 µm.

14. An optical scanning device according to claim 1, in which the objective lens system includes a solid immersion lens.

15. An optical scanning device according to claim 14, in which the solid immersion lens is partially spherical and has a substantially equal radius and thickness.

16. An optical scanning device according to claim 14, in which the refractive index of the transparent layer is dissimilar to the refractive index of the solid immersion lens.

17. An optical scanning device according to claim 1, in which the numerical aperture of the objective lens system is greater than 1.

18. An optical record carrier for use with an optical scanning device according to claim 1, the optical record carrier being adapted for use with radiation of a predetermined wavelength and an objective lens system of a predetermined numerical aperture, wherein the optical record carrier includes an information layer for storing data and a transparent layer through which radiation passes to reach the information layer, the cuter surface of the transparent layer having a lubricant coating for improving the scanning characteristics when scanned with a slider, in which the thickness of the transparent layer is at least $$d = \frac{5 \cdot \lambda \cdot n_{cov}}{NA_{NF}},$$

where d is the thickness of the transparent layer, $\lambda$ is the radiation wavelength, $n_{cov}$ is the refractive index of the transparent layer, $NA_{NF}$ is the numerical aperture of the objective lens system.

19. An optical record carrier according to claim 18, in which the thickness of the transparent layer is at least $$d = \frac{11 \cdot \lambda \cdot n_{cov}}{NA_{NF}}.$$

20. An optical record carrier according to claim 18, in which the thickness of the transparent layer is at least 1.6 µm.

21. An optical record carrier according to claim 20, wherein the thickness of the transparent layer is between 2 and 50 µm.

* * * * *